United States Patent
Swarup et al.

(10) Patent No.: US 9,938,366 B2
(45) Date of Patent: Apr. 10, 2018

(54) ACRYLIC COPOLYMER COMPOSITION PREPARED FROM VINYL ESTER OR AMIDE FUNCTIONAL MONOMERS

(71) Applicant: PPG INDUSTRIES OHIO, INC., Cleveland, OH (US)

(72) Inventors: Shanti Swarup, Allison Park, PA (US); Richard J. Sadvary, Tarentum, PA (US); Timothy Syput, New Kensington, PA (US); Kalsani Venkateshwarlu, Gibsonia, PA (US); Kelly E. Lutz, Henderson, KY (US); Simion Coca, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 5 days.

(21) Appl. No.: 15/178,586

(22) Filed: Jun. 10, 2016

(65) Prior Publication Data

US 2017/0355796 A1    Dec. 14, 2017

(51) Int. Cl.
*C08F 218/08*    (2006.01)
*C09D 5/00*    (2006.01)
*C09D 131/04*    (2006.01)

(52) U.S. Cl.
CPC ............ *C08F 218/08* (2013.01); *C09D 5/002* (2013.01); *C09D 131/04* (2013.01)

(58) Field of Classification Search
CPC ..... C08F 218/08; C09D 5/002; C09D 131/04; C09D 133/12; C25D 13/00; B01J 13/14; B01J 13/206; B01J 13/22; B32B 27/30; B32B 27/08; C08J 7/047; C08J 5/18
See application file for complete search history.

(56) References Cited

U.S. PATENT DOCUMENTS

| | | | |
|---|---|---|---|
| 3,826,669 A * | 7/1974 | Antlfinger et al. .... | C08G 59/68 106/287.18 |
| 4,440,894 A | 4/1984 | Zychowski et al. | |
| 4,657,994 A | 4/1987 | Tanaka et al. | |
| 7,323,529 B2 | 1/2008 | Sutton et al. | |
| 2004/0019142 A1 | 1/2004 | Rink et al. | |
| 2008/0154001 A1* | 6/2008 | Imai et al. ............ | C08F 226/10 526/218.1 |
| 2010/0167609 A1 | 7/2010 | McLennan et al. | |
| 2012/0028783 A1 | 2/2012 | van Boxtel et al. | |
| 2014/0158300 A1* | 6/2014 | Hayata et al. ......... | C09J 133/08 156/345.3 |
| 2015/0291810 A1 | 10/2015 | Peskens | |

* cited by examiner

*Primary Examiner* — Nathan M Nutter
(74) *Attorney, Agent, or Firm* — Krisanne Shideler

(57) ABSTRACT

The present invention is directed to an acrylic copolymer composition prepared from a monomer composition. The monomer composition is essentially free of solvents having a boiling point less than 120° C. and essentially free of acid functional monomers. The monomer composition or acrylic copolymer composition comprises:

(A) 30 to 70 percent by weight of a monomer having the structure (I):

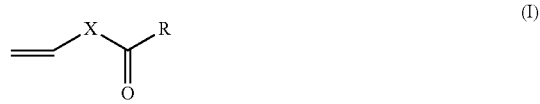

(I)

wherein (i) X is NR' or O, R' is hydrogen or is a linear or branched alkyl group having 1 to 18 carbon atoms, and R is a linear or branched alkyl group having 1 to 18 carbon atoms, or (ii) X is N or O and R is a linear or branched alkyl group bonded to X to form a 5- to 7-member ring; based on the total weight of monomers in the monomer composition; and (B) 30 to 70 percent by weight of at least one different ethylenically unsaturated monomer. The present invention is also directed to curable film-forming compositions containing these acrylic copolymer compositions, and substrates coated with the curable film-forming compositions.

15 Claims, No Drawings

ACRYLIC COPOLYMER COMPOSITION PREPARED FROM VINYL ESTER OR AMIDE FUNCTIONAL MONOMERS

FIELD OF THE INVENTION

The present invention relates to copolymer compositions prepared from vinyl ester or amide functional monomers, and the use of these copolymers in the preparation of curable film-forming compositions.

BACKGROUND OF THE INVENTION

Acrylic petroleum-derived monomers such as alkyl (meth)acrylates have been staples in polymerization processes in various industries for decades. Unfortunately, variations in the oil market can cause great price fluctuations in these monomers, and consistently low cost alternatives are being sought. The shale gas boom has provided promising alternatives such as vinyl ester and vinyl amide monomers. However, these monomers are not without their drawbacks. Low boiling points make them difficult to handle under ambient conditions, and hence their use as monomers in polymerization processes is difficult due to their volatility.

It would be desirable to provide an acrylic copolymer using these readily available and inexpensive monomers, for use in the preparation of curable coatings and other compositions.

SUMMARY OF THE INVENTION

The present invention is directed to an acrylic copolymer composition essentially free of solvents having a boiling point less than 120° C. and essentially free of acid-functional groups, and prepared from a monomer composition, wherein the monomer composition is essentially free of solvents having a boiling point less than 120° C. and essentially free of acid functional monomers, and wherein the monomer composition comprises:

(A) 30 to 70 percent by weight of a monomer having the structure (I):

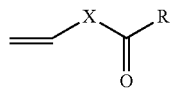
(I)

wherein (i) X is NR' or O, R' is hydrogen or is a linear or branched alkyl group having 1 to 18 carbon atoms, and R is a linear or branched alkyl group having 1 to 18 carbon atoms, or (ii) X is N or O and R is a linear or branched alkyl group bonded to X to form a 5- to 7-member ring; based on the total weight of monomers in the monomer composition; and (B) 30 to 70 percent by weight, based on the total weight of monomers used to prepare the acrylic copolymer composition, of an ethylenically unsaturated monomer different from (A) and selected from at least one of vinyl compounds; nitriles; vinylidene compounds; alkyl esters of (meth)acrylic acid containing from 1 to 30 carbon atoms in the alkyl group; and aryl esters of (meth)acrylic acid containing from 6 to 30 carbon atoms in the aryl group.

The present invention is also directed to curable film-forming compositions containing these acrylic copolymer compositions, and substrates coated with the curable film-forming compositions.

DETAILED DESCRIPTION OF THE INVENTION

The present invention is directed to an acrylic copolymer composition. The copolymer composition is prepared from a monomer composition comprising:

(A) 30 to 70 percent by weight of a monomer having the structure (I):

wherein (i) X is NR' or O, R' is hydrogen or is a linear or branched alkyl group having 1 to 18 carbon atoms, and R is a linear or branched alkyl group having 1 to 18 carbon atoms, or (ii) X is N or O and R is a linear or branched alkyl group bonded to X to form a 5- to 7-member ring; based on the total weight of monomers in the monomer composition; and (B) 30 to 70 percent by weight, based on the total weight of monomers used to prepare the acrylic copolymer composition, of an ethylenically unsaturated monomer different from (A) and selected from at least one of vinyl compounds; nitriles; vinylidene compounds; alkyl esters of (meth)acrylic acid containing from 1 to 30 carbon atoms in the alkyl group; and aryl esters of (meth)acrylic acid containing from 6 to 30 carbon atoms in the aryl group. Typically, the monomer composition is essentially free of solvents having a boiling point less than 120° C., such as butanol, and essentially free of acid functional monomers. In certain scenarios, the monomer composition may be completely free of solvents having a boiling point less than 120° C. and acid functional monomers.

By "polymer" is meant a polymer including homopolymers and copolymers, oligomers, and prepolymers; i.e., a material that may be chain extended to increase its molecular weight. By "composite material" is meant a combination of two or more differing materials.

Unless otherwise indicated, molecular weights are reported as number average molecular weights determined by gel permeation chromatography relative to polystyrene standards with the unit of g/mol.

Vinyl compounds are ethylenically unsaturated compounds containing the functional group —C=CH$_2$, where one of the ethylenic carbons is mono-substituted. Styrene is an example of a vinyl compound; in particular, a vinyl aromatic compound. Vinylidene compounds are ethylenically unsaturated compounds containing the functional group C=CH$_2$, where one of the ethylenic carbons is di-substituted. Vinylidene chloride is an example of a vinylidene compound. Acrylic and methacrylic are designated herein in a summarizing manner as (meth)acrylic, although technically, acrylic monomers are vinyl compounds and methacrylic monomers are vinylidene compounds according to the definitions above. Likewise, allyl and methallyl are designated herein in a summarizing manner as (meth)allyl.

By "essentially free" of a material is meant that a composition has only trace or incidental amounts of a given material, and that the material is not present in an amount sufficient to affect any properties of the composition. In other words, these materials are not essential to the composition and hence the composition is free of these materials in any appreciable or essential amount. If they are present, it is typically less than 0.1 percent by weight, based on the total weight of solids in the composition.

The monomers having structure (I) include vinyl esters and amides of alkyl and cycloalkyl carboxylic acids and lactams. Examples of vinyl esters of alkyl carboxylic acids include vinyl acetate, vinyl pivalate, vinyl laurate, vinyl dodecanoate, and the like. Examples of other suitable vinyl compounds having structure (I) include vinyl amides and vinyl lactams such as vinyl pyrrolidone and vinyl caprolactam.

Monomers according to structure (I) are typically included in the monomer composition and are present in the acrylic copolymer at a level of at least 30 percent by weight, such as at least 40 percent by weight, in some cases at least 50 percent by weight, based on the total weight of monomers in the monomer composition. Also, the amount of monomers according to structure (I) do not exceed 70 percent by weight, in some cases do not exceed 68 percent by weight, or 65 percent by weight. The amount of monomers according to structure (I) can be included at any indicated amount or any values within the ranges recited above.

In addition to the monomer (A) having structure (I), the monomer composition further includes (B) one or more ethylenically unsaturated monomers different from (A), usually not having structure (I), and selected from at least one of vinyl compounds including vinyl aromatic compounds; nitriles; vinylidene compounds; alkyl esters of (meth)acrylic acid containing from 1 to 30 carbon atoms in the alkyl group; and aryl esters of (meth)acrylic acid containing from 6 to 30 carbon atoms in the aryl group. Monomers having reactive functional groups are also suitable. For example, ethylenically unsaturated monomers may have a reactive functional group selected from epoxy, carboxylic acid, hydroxy, amide, oxazoline, carbamate, amine, amine salt, quaternized amine, thiol, methylol, methylol ether, and sulfonium salt. Particular examples of monomers include hydroxyethyl acrylate, hydroxypropyl acrylate, methyl acrylate, ethyl acrylate, butyl acrylate, isobutyl acrylate, isobornyl acrylate, dimethylaminoethyl acrylate, acrylamide, chlorotrifluoroethylene, glycidyl acrylate, 2-ethylhexyl acrylate and n-butoxy methyl acrylamide. Typically, the monomer composition is essentially free of carboxylic acid functional monomers such as (meth)acrylic acid.

Ethylenically unsaturated monomers (B) are typically included in the monomer composition and are present in the acrylic copolymer at a level of at least 30 percent by weight, such as at least 40 percent by weight, in some cases at least 50 percent by weight, based on the total weight of monomers in the monomer composition. Also, the amount of ethylenically unsaturated monomers (B) does not exceed 70 percent by weight, in some cases do not exceed 68 percent by weight, or 65 percent by weight. The amount of ethylenically unsaturated monomers (B) can be included at any indicated level or can range between any values recited above.

A typical monomer composition comprises 40 to 70 percent by weight vinyl acetate, 10 to 40 percent by weight alkyl (meth)acrylate, and 10 to 30 percent by weight hydroxy functional alkyl (meth)acrylate, for a total of 100 percent by weight of these monomers, wherein each percentage is based on the total weight of monomers in the monomer composition. For example, monomer compositions comprising 50 percent by weight vinyl acetate, 30 percent by weight butyl acrylate, and 20 percent by weight hydroxyethyl acrylate, or 50 percent by weight vinyl acetate, 20 percent by weight butyl acrylate, and 30 percent by weight hydroxyethyl acrylate have been prepared.

The monomer composition may further comprise a solvent, typically an organic solvent. One or more of the monomers may be at least partially soluble in the solvent. Aromatic solvents known in the art are suitable, such as toluene, xylene, and aromatic solvent blends derived from petroleum such as those available from Exxon Mobil Corporation. The monomer composition is essentially free of butanol, including all isomeric forms thereof.

Particularly suitable solvents have a boiling point greater than 120° C., such as greater than 125° C., or greater than 150° C.

An initiator composition may be added to the monomer composition in one or more stages to effect and continue polymerization. Polymerization may be done using any known process including those described below. The initiator composition typically includes a thermal free radical initiator and optionally one or more solvents, such as those described above for use in the monomer composition. Any suitable thermal free radical initiator can be used in the polymerization. Suitable thermal free radical initiators include, but are not limited to, peroxide compounds, azo compounds, persulfate compounds, and mixtures thereof.

Any suitable peroxide compound that can initiate polymerization can be used to prepare the acrylic copolymer composition of the invention. As non-limiting examples, the suitable peroxide compounds can be selected from hydrogen peroxide, methyl ethyl ketone peroxides, benzoyl peroxides, ditertbutyl peroxides, ditertamyl peroxides, dicumyl peroxides, diacyl peroxides, decanoyl peroxide, lauroyl peroxide, peroxydicarbonates, peroxyesters, dialkyl peroxides, hydroperoxides, and peroxyketals.

Any suitable azo compound that can initiate polymerization can be used in the invention. As non-limiting examples, the azo compounds can be selected from 4-4'-azobis(4-cyanovaleric acid), 1-1'-azobiscyclohexanecarbonitrile, 2-2'-azobisisobutyronitrile, 2-2'-azobis(2-methylpropionamidine)dihydrochloride, 2-2'-azobis(2-methylbutyronitrile), 2-2'-azobis(propionitrile), 2-2'-azobis(2,4-dimethylvaleronitrile), 2-2'-azobis(valeronitrile), 2,2'-azobis[2-methyl-N-(2-hydroxyethyl)propionamide], 4,4'-azobis(4-cyanopentanoic acid), 2,2'-azobis(N,N'-dimethyleneisobutyramidine), 2,2'-azobis(2-amidinopropane)dihydrochloride, 2,2'-azobis(N, N'-dimethyleneisobutyramidine)dihydrochloride and 2-(carbamoylazo)-isobutyronitrile.

The acrylic copolymer compositions of the present invention may be prepared by a batch solution polymerization process, such as that described in Example 1 of U.S. Pat. No. 4,440,894. In such an exemplary process, solvent is charged to a flask equipped with thermometer, agitator, condenser and dropping funnel. The dropping funnel is charged with the monomer composition, including initiators. The solvent in the flask is heated to about 100° C., such as by using a heating mantle. The contents of the dropping funnel are slowly added to the hot solvent in the flask over a period of 4-5 hours, while maintaining reflux temperature. After addition is completed, the contents of the flask may be held at reflux temperature for several additional hours to ensure conversion of monomers to copolymer. Then the product may be cooled and diluted to a desired solids content using additional solvent.

The acrylic copolymer compositions of the present invention may alternatively be prepared in a pressurized tank by a continuous polymerization process, such as that described in U.S. Pat. No. 7,323,529, incorporated herein by reference in its entirety.

The conversion (i.e., the chemical transformation of monomers to copolymers) can vary based on the desired process parameters employed and the characteristics (molecular weight, copolymer composition, and the like). In many cases unreacted monomers can be removed later in the process. The conversion can be, for example, at least 50%, in some cases at least 55%, in other cases at least 60%, in some situations at least 65%, and in other situations at least 75% calculated as the weight percent of copolymer based on the total weight of monomers employed. Also, the conversion can be up to 100%, in some cases up to 99.9%, in other cases up to 99%, in some situations up to 96%, in other situations up to 95%, and in particular situations up to 90% calculated as the weight percent of copolymer based on the total weight of monomers employed. The conversion can be any value or range between any set of values recited above.

After polymerization, the copolymer composition often has a solids content of over 90 percent by weight. The copolymer composition may be mixed with a solvent, such as any of those disclosed herein, to a final solids content of, for example, 65 to 70 percent by weight.

The acrylic copolymer composition of the present invention typically has a number average molecular weight of at least 250, in many cases at least 500, typically at least 1,000, and in some cases at least 2,000. The present copolymer may have a molecular weight of up to 1,000,000, in many cases up to 500,000, typically up to 100,000, and in some cases up to 50,000. Certain applications will require that the molecular weight of the present copolymer not exceed 25,000, in some cases not exceed 20,000, and in certain instances not exceed 16,000. The molecular weight of the copolymer is selected based on the properties that are to be incorporated into the copolymer composition. The molecular weight of the copolymer may vary in any range of values inclusive of those stated above. As noted above, molecular weights are reported as number average molecular weights determined by gel permeation chromatography relative to polystyrene standards with the unit of g/mol.

The polydispersity index (PDI) of the copolymer produced using the present method is typically less than 4, in many cases less than 3.5, typically less than 3.0, and in some cases less than 2.5. As used herein and in the claims, "polydispersity index" is determined from the following equation: (weight average molecular weight ($M_w$)/number average molecular weight ($M_n$)). A monodisperse polymer has a PDI of 1.0. As used herein, $M_n$ and $M_w$ are determined from gel permeation chromatography using polystyrene standards.

Acrylic copolymer compositions in accordance with the present invention may be used to prepare curable film-forming compositions. Such curable film-forming compositions comprise (a) a curing agent having reactive functional groups and (b) an acrylic copolymer of the present invention. The acrylic copolymer will contain reactive functional groups, incorporated using appropriate ethylenically unsaturated monomers that are reactive with functional groups on the curing agent (a).

The term "curable", as used for example in connection with a curable composition, means that the indicated composition is polymerizable or cross linkable through functional groups, e.g., by means that include, but are not limited to, thermal (including ambient cure), catalytic, electron beam, chemical free-radical initiation, and/or photo-initiation such as by exposure to ultraviolet light or other actinic radiation.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive groups occurs, the rate of reaction of the remaining unreacted reactive groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness. Curing or crosslinking reactions also may be carried out under ambient conditions. By "ambient conditions" is meant the condition of surroundings without adjustment of the temperature, humidity or pressure. For example, a composition that cures at ambient temperature undergoes a thermosetting reaction without the aid of heat or other energy, for example, without baking in an oven, use of forced air, or the like. Usually ambient temperature ranges from 60 to 90° F. (15.6 to 32.2° C.), such as a typical room temperature, 72° F. (22.2° C.). Once cured or crosslinked, a thermosetting resin will not melt upon the application of heat and is insoluble in solvents.

The term "reactive" refers to a functional group capable of undergoing a chemical reaction with itself and/or other functional groups spontaneously or upon the application of heat or in the presence of a catalyst or by any other means known to those skilled in the art.

Suitable curing, or crosslinking, agents (a) for use in the curable film-forming compositions of the present invention include aminoplasts, polyisocyanates, including blocked isocyanates, polyepoxides, beta-hydroxyalkylamides, polyacids, organometallic acid-functional materials, polyamines, polyamides, polysulfides, polythiols, polyenes such as polyacrylates, polyols, polysilanes and mixtures of any of the foregoing, and include those known in the art for any of these materials.

Useful aminoplasts can be obtained from the condensation reaction of formaldehyde with an amine or amide. Nonlimiting examples of amines or amides include melamine, urea and benzoguanamine.

Although condensation products obtained from the reaction of alcohols and formaldehyde with melamine, urea or benzoguanamine are most common, condensates with other amines or amides can be used. Formaldehyde is the most commonly used aldehyde, but other aldehydes such as acetaldehyde, crotonaldehyde, and benzaldehyde can also be used.

The aminoplast can contain imino and methylol groups. In certain instances, at least a portion of the methylol groups can be etherified with an alcohol to modify the cure response. Any monohydric alcohol like methanol, ethanol, n-butyl alcohol, isobutanol, and hexanol can be employed for this purpose. Nonlimiting examples of suitable aminoplast resins are commercially available from Cytec Industries, Inc. under the trademark CYMEL® and from Solutia, Inc. under the trademark RESIMENE®.

Other crosslinking agents suitable for use include polyisocyanate crosslinking agents. As used herein, the term "polyisocyanate" is intended to include blocked (or capped) polyisocyanates as well as unblocked polyisocyanates. The polyisocyanate can be aliphatic, aromatic, or a mixture thereof. Although higher polyisocyanates such as isocyanurates of diisocyanates are often used, diisocyanates can also be used. Isocyanate prepolymers, for example reaction products of polyisocyanates with polyols also can be used. Mixtures of polyisocyanate crosslinking agents can be used.

Aliphatic and cycloaliphatic are designated herein in a summarizing manner as (cyclo)aliphatic.

The polyisocyanate can be prepared from a variety of isocyanate-containing materials. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used.

Isocyanate groups may be capped or uncapped as desired. If the polyisocyanate is to be blocked or capped, any suitable aliphatic, cycloaliphatic, or aromatic alkyl monoalcohol or phenolic compound known to those skilled in the art can be used as a capping agent for the polyisocyanate. Examples of suitable blocking agents include those materials which would unblock at elevated temperatures such as lower aliphatic alcohols including methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Other suitable capping agents include oximes such as methyl ethyl ketoxime, acetone oxime and cyclohexanone oxime, lactams such as epsilon-caprolactam, pyrazoles such as dimethyl pyrazole, and amines such as dibutyl amine.

Polyepoxides are suitable curing agents for polymers having carboxylic acid groups and/or amine groups. Examples of suitable polyepoxides include low molecular weight polyepoxides such as 3,4-epoxycyclohexylmethyl 3,4-epoxycyclohexanecarboxylate and bis(3,4-epoxy-6-methylcyclohexyl-methyl) adipate. Higher molecular weight polyepoxides, including the polyglycidyl ethers of polyhydric phenols and alcohols described above, are also suitable as crosslinking agents.

Beta-hydroxyalkylamides are suitable curing agents for polymers having carboxylic acid groups. The beta-hydroxyalkylamides can be depicted structurally as follows:

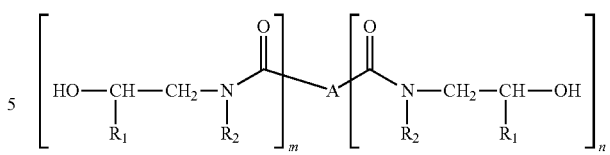

wherein $R_1$ is H or $C_1$ to $C_5$ alkyl; $R_2$ is H, $C_1$ to $C_5$ alkyl, or:

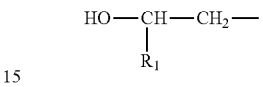

wherein $R_1$ is as described above; A is a bond or a polyvalent organic radical derived from a saturated, unsaturated, or aromatic hydrocarbon including substituted hydrocarbon radicals containing from 2 to 20 carbon atoms; m is equal to 1 or 2; n is equal to 0 or 2, and m+n is at least 2, usually within the range of from 2 up to and including 4. Most often, A is a $C_2$ to $C_{12}$ divalent alkylene radical.

Polyacids, particularly polycarboxylic acids, are suitable curing agents for polymers having epoxy functional groups. Examples of suitable polycarboxylic acids include adipic, succinic, sebacic, azelaic, and dodecanedioic acid. Other suitable polyacid crosslinking agents include acid group-containing acrylic polymers prepared from an ethylenically unsaturated monomer containing at least one carboxylic acid group and at least one ethylenically unsaturated monomer that is free from carboxylic acid groups. Such acid functional acrylic polymers can have an acid number ranging from 30 to 150 mg KOH/g resin. Acid values are determined potentiometrically using the method described at page 36 of Surface Chemistry, vol. 1, 1983. Acid functional group-containing polyesters can be used as well. Low molecular weight polyesters and half-acid esters can be used which are based on the condensation of aliphatic polyols with aliphatic and/or aromatic polycarboxylic acids or anhydrides. Examples of suitable aliphatic polyols include ethylene glycol, propylene glycol, butylene glycol, 1,6-hexanediol, trimethylol propane, di-trimethylol propane, neopentyl glycol, 1,4-cyclohexanedimethanol, pentaerythritol, and the like. The polycarboxylic acids and anhydrides may include, inter alia, terephthalic acid, isophthalic acid, phthalic acid, phthalic anhydride, tetrahydrophthalic acid, tetrahydrophthalic anhydride, hexahydrophthalic anhydride, methylhexahydrophthalic anhydride, chlorendic anhydride, and the like. Mixtures of acids and/or anhydrides may also be used. The above-described polyacid crosslinking agents are described in further detail in U.S. Pat. No. 4,681,811, at column 6, line 45 to column 9, line 54, which is incorporated herein by reference.

Nonlimiting examples of suitable polyamine crosslinking agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Nonlimiting examples of suitable aliphatic and alicyclic diamines include 1,2-ethylene diamine, 1,2-propylene diamine, 1,8-octane diamine, isophorone diamine, propane-2,2-cyclohexyl amine, and the like. Nonlimiting examples of suitable aromatic diamines include phenylene diamines and toluene diamines, for example o-phenylene diamine and p-tolylene diamine. Polynuclear aromatic diamines such as 4,4'-biphenyl diamine, methylene dianiline and monochloromethylene dianiline are also suitable.

Examples of suitable aliphatic diamines include, without limitation, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof. Cycloaliphatic diamines are available commercially from Huntsman Corporation (Houston, Tex.) under the designation of JEFFLINK™ such as JEFFLINK™ 754. Additional aliphatic cyclic polyamines may also be used, such as DESMOPHEN NH 1520 available from Bayer MaterialScience and/or CLEARLINK 1000, which is a secondary aliphatic diamine available from Dorf Ketal. POLYCLEAR 136 (available from BASF/Hansen Group LLC), the reaction product of isophorone diamine and acrylonitrile, is also suitable. Other exemplary suitable polyamines are described in U.S. Pat. No. 4,046,729 at column 6, line 61 to column 7, line 26, and in U.S. Pat. No. 3,799,854 at column 3, lines 13 to 50, the cited portions of which are incorporated by reference herein. Additional polyamines may also be used, such as ANCAMINE polyamines, available from Air Products and Chemicals, Inc.

Suitable polyamides include any of those known in the art. For example, ANCAMIDE polyamides, available from Air Products and Chemicals, Inc.

Suitable polyenes may include those that are represented by the formula:

A-(X)$_m$ wherein A is an organic moiety, X is an olefinically unsaturated moiety and m is at least 2, typically 2 to 6. Examples of X are groups of the following structure:

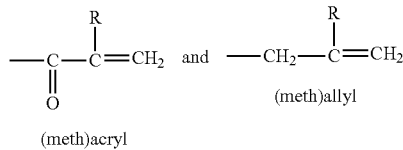

wherein each R is a radical selected from H and methyl.

The polyenes may be compounds or polymers having in the molecule olefinic double bonds that are polymerizable by exposure to radiation. Examples of such materials are (meth)acrylic-functional (meth)acrylic copolymers, epoxy resin (meth)acrylates, polyester (meth)acrylates, polyether (meth)acrylates, polyurethane (meth)acrylates, amino (meth)acrylates, silicone (meth)acrylates, and melamine (meth)acrylates. The number average molecular weight (Mn) of these compounds is often around 200 to 10,000. The molecule often contains on average 2 to 20 olefinic double bonds that are polymerizable by exposure to radiation. Aliphatic and/or cycloaliphatic (meth)acrylates in each case are often used. (Cyclo)aliphatic polyurethane (meth)acrylates and (cyclo)aliphatic polyester (meth)acrylates are particularly suitable. The binders may be used singly or in mixture.

Specific examples of polyurethane (meth)acrylates are reaction products of the polyisocyanates such as 1,6-hexamethylene diisocyanate and/or isophorone diisocyanate including isocyanurate and biuret derivatives thereof with hydroxyalkyl (meth)acrylates such as hydroxyethyl (meth) acrylate and/or hydroxypropyl (meth)acrylate. The polyisocyanate can be reacted with the hydroxyalkyl (meth)acrylate in a 1:1 equivalent ratio or can be reacted with an NCO/OH equivalent ratio greater than 1 to form an NCO-containing reaction product that can then be chain extended with a polyol such as a diol or triol, for example 1,4-butane diol, 1,6-hexane diol and/or trimethylol propane. Examples of polyester (meth)acrylates are the reaction products of (meth) acrylic acid or anhydride with polyols, such as diols, triols and tetrols, including alkylated polyols, such as propoxylated diols and triols. Examples of polyols include 1,4-butane diol, 1,6-hexane diol, neopentyl glycol, trimethylol propane, pentaerythritol and propoxylated 1,6-hexane diol. Specific examples of polyester (meth)acrylate are glycerol tri(meth)acrylate, trimethylolpropane tri(meth)acrylate, pentaerythritol tri(meth)acrylate and pentaerythritol tetra(meth) acrylate.

Besides (meth)acrylates, (meth)allyl compounds or polymers can be used either alone or in combination with (meth)acrylates. Examples of (meth)allyl materials are polyallyl ethers such as the diallyl ether of 1,4-butane diol and the triallyl ether of trimethylol propane. Examples of other (meth)allyl materials are polyurethanes containing (meth) allyl groups. For example, reaction products of the polyisocyanates such as 1,6-hexamethylene diisocyanate and/or isophorone diisocyanate including isocyanurate and biuret derivatives thereof with hydroxyl-functional allyl ethers, such as the monoallyl ether of 1,4-butane diol and the diallylether of trimethylol propane. The polyisocyanate can be reacted with the hydroxyl-functional allyl ether in a 1:1 equivalent ratio or can be reacted with an NCO/OH equivalent ratio greater than 1 to form an NCO-containing reaction product that can then be chain extended with a polyol such as a diol or triol, for example 1,4-butane diol, 1,6-hexane diol and/or trimethylol propane.

As used herein the term "polythiol functional material" refers to polyfunctional materials containing two or more thiol functional groups (SH). Suitable polythiol functional materials for use in forming the curable film-forming composition are numerous and can vary widely. Such polythiol functional materials can include those that are known in the art. Non-limiting examples of suitable polythiol functional materials can include polythiols having at least two thiol groups including compounds and polymers. The polythiol can have ether linkages (—O—), sulfide linkages (—S—), including polysulfide linkages (—S$_x$—), wherein x is at least 2, such as from 2 to 4, and combinations of such linkages.

The polythiols for use in the present invention include materials of the formula:

R$^1$—(SH)$_n$ wherein R$^1$ is a polyvalent organic moiety and n is an integer of at least 2, typically 2 to 6.

Non-limiting examples of suitable polythiols include esters of thiol-containing acids of the formula HS—R$^2$—COOH wherein R$^2$ is an organic moiety with polyhydroxy compounds of the structure R$^3$—(OH)$_n$ wherein R$^3$ is an organic moiety and n is at least 2, typically 2 to 6. These components can be reacted under suitable conditions to give polythiols having the general structure:

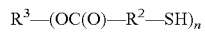

$R^3$—(OC(O)—$R^2$—SH)$_n$ wherein $R^2$, $R^3$ and n are as defined above.

Examples of thiol-containing acids are thioglycolic acid (HS—CH$_2$COOH), α-mercaptopropionic acid (HS—CH(CH$_3$)—COOH) and β-mercaptopropionic acid (HS—CH$_2$CH$_2$COOH) with polyhydroxy compounds such as glycols, triols, tetrols, pentaols, hexaols, and mixtures thereof. Other non-limiting examples of suitable polythiols include ethylene glycol bis (thioglycolate), ethylene glycol bis(β-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), and mixtures thereof.

Suitable polyacids and polyols useful as curing agents include any of those known in the art, such as those commonly used for the making of polyesters.

Appropriate mixtures of curing agents may also be used in the invention. The amount of the curing agent in the curable film-forming composition generally ranges from 5 to 75 percent by weight based on the total weight of resin solids (i.e., curing agent (a) plus acrylic copolymer composition (b)) in the curable film-forming composition. For example, the minimum amount of curing agent may be at least 5 percent by weight, often at least 10 percent by weight and more often, at least 15 percent by weight. The maximum amount of curing agent may be 75 percent by weight, more often 60 percent by weight, or 50 percent by weight. Ranges of curing agent may include, for example, 5 to 50 percent by weight, 5 to 60 percent by weight, 10 to 50 percent by weight, 10 to 60 percent by weight, 10 to 75 percent by weight, 15 to 50 percent by weight, 15 to 60 percent by weight, and 15 to 75 percent by weight.

The amount of the acrylic copolymer in the curable film-forming composition generally ranges from 5 to 75 percent by weight based on the total weight of resin solids in the curable film-forming composition. For example, the minimum amount of acrylic copolymer may be at least 5 percent by weight, often at least 10 percent by weight and more often, at least 15 percent by weight. The maximum amount of acrylic copolymer may be 75 percent by weight, more often 60 percent by weight, or 50 percent by weight. Ranges of acrylic copolymer may include, for example, 5 to 50 percent by weight, 5 to 60 percent by weight, 10 to 50 percent by weight, 10 to 60 percent by weight, 10 to 75 percent by weight, 15 to 50 percent by weight, 15 to 60 percent by weight, and 15 to 75 percent by weight.

The curable film-forming compositions of the present invention may contain adjunct ingredients conventionally used in coating compositions. Optional ingredients such as, for example, plasticizers, surfactants, thixotropic agents, anti-gassing agents, organic cosolvents, flow controllers, anti-oxidants, UV light absorbers and similar additives conventional in the art may be included in the composition. These ingredients are typically present at up to about 40% by weight based on the total weight of resin solids in the curable film-forming composition.

All of the coating compositions described above may contain colorants conventionally used in surface coatings, rendering them translucent or opaque. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions, rendering the coating composition translucent or opaque. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes. Example nanoparticle dispersions and methods for making them are identified in U.S. Pat. No. 6,875,800 B2, which is incorporated herein by reference in its entirety. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference in its entirety, and U.S. Provisional Application No. 60/482,167 filed Jun. 24, 2003.

In general, the colorant can be present in the coating composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

The present invention is further drawn to substrates at least partially coated with the curable film-forming composition described above. Substrates to which compositions of the present invention may be applied include rigid metal substrates such as ferrous metals, aluminum, aluminum alloys, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. The substrate may alternatively comprise a polymeric material or a composite material such as a fiberglass composite. Car parts typically formed from thermoplastic and thermoset materials include bumpers and trim. It is desirable to have a coating system which can be applied to both metal and non-metal parts.

The shape of the metal substrate can be in the form of a sheet, plate, bar, rod or any shape desired, but it is usually in the form of an automobile part, such as a body, door, fender, hood or bumper. The thickness of the substrate can vary as desired.

The curable film-forming composition may be applied directly to the substrate when there is no intermediate coating between the substrate and the curable film-forming composition. By this is meant that the substrate may be bare, as described below, or may be treated with one or more pretreatment compositions as described below, but the substrate is not coated with any coating compositions such as an electrodepositable composition or a primer composition prior to application of the curable film-forming composition of the present invention.

As noted above, the substrates to be used may be bare metal substrates. By "bare" is meant a virgin metal substrate that has not been treated with any pretreatment compositions such as conventional phosphating baths, heavy metal rinses, etc. Additionally, bare metal substrates being used in the present invention may be a cut edge of a substrate that is otherwise treated and/or coated over the rest of its surface. Alternatively, the substrates may undergo one or more treatment steps known in the art prior to the application of the curable film-forming composition.

Before depositing any coating compositions upon the surface of the substrate, it is common practice, though not necessary, to remove foreign matter from the surface by thoroughly cleaning and degreasing the surface. Such cleaning typically takes place after forming the substrate (stamping, welding, etc.) into an end-use shape. The surface of the substrate can be cleaned by physical or chemical means, or both, such as mechanically abrading the surface or cleaning/degreasing with commercially available alkaline or acidic cleaning agents which are well known to those skilled in the art, such as sodium metasilicate and sodium hydroxide. A non-limiting example of a cleaning agent is CHEMKLEEN 163, an alkaline-based cleaner commercially available from PPG Industries, Inc.

Following the cleaning step, the substrate may be rinsed with deionized water or an aqueous solution of rinsing agents in order to remove any residue. The substrate can be air dried, for example, by using an air knife, by flashing off the water by brief exposure of the substrate to a high temperature or by passing the substrate between squeegee rolls.

An initial step of forming an electrodeposited coating upon the surface of the substrate prior to applying the curable film-forming composition may be performed, then the curable film-forming composition is applied directly onto the electrodeposited coating. Suitable electrodepositable coating compositions include conventional anionic or cationic electrodepositable coating compositions. Methods for electrodepositing coatings are well known to those skilled in the art and a detailed discussion thereof is not included here. Suitable compositions and methods are discussed in U.S. Pat. No. 5,530,043 (relating to anionic electrodeposition) and U.S. Pat. Nos. 5,760,107; 5,820,987 and 4,933,056 (relating to cationic electrodeposition) which are hereby incorporated by reference in their entireties. The electrodeposited coating is usually cured prior to the application of the curable film-forming composition. Curing conditions may be those typically used for electrodeposited coating compositions. After curing the electrodeposited coating, the curable film-forming composition may then be applied directly onto the electrodeposited coating. The curable film-forming composition of the present invention may be used as a primer as described, but is also suitable for use as any curable film-forming composition in a multilayer coating stack known to those skilled in the art. At least one additional coating composition may be applied on top of the curable film-forming composition of the present invention as desired. Usually this comprises one or more topcoats, such as a monocoat or a composite coating system comprising a colored basecoat followed by a clear coat.

To form a typical coated substrate in accordance with the present invention, the curable film-forming composition is applied to at least a portion of a surface of the substrate. This first coating composition, and all subsequent coating layers, may be applied to the substrate by one or more of a number of methods including spraying, rolling, curtain coating, dipping/immersion, brushing, or flow coating, but they are most often applied by spraying for the sake of appearance. The usual spray techniques and equipment for air spraying and electrostatic spraying and either manual or automatic methods can be used. The first coating composition is applied in an amount to yield a dry film thickness of 15 to 30 microns.

After forming a film of the curable film-forming composition on the substrate, this coating layer can be given a drying step in which solvent is driven out of the coating film by heating or an air drying period at room temperature before application of the second coating composition. Suitable drying conditions may depend, for example, on the ambient temperature and humidity. At this point, the coated substrate may be held at a temperature and for a time sufficient to substantially cure the curable film-forming composition. Additional coating layers may be applied if desired after this curing step. It is also possible to apply one or more subsequent coating compositions immediately to the first without curing or even drying the first coating. Such a coating process is often referred to as "wet-on-wet". A second coating layer typically has a dry film thickness of 10 to 25 microns. When a color-plus-clear composite coating is applied, the clear coating layer typically has a dry film thickness of 30 to 50 microns. Dry film thicknesses may be measured 24 hours after application of the coating when cured at ambient temperatures, using a DUALSCOPE FMP40C with an FD13H probe, available from Fischer Technologies, Inc., according to manufacturer's directions.

After application of any additional coating compositions to the first, forming a composite coating on the substrate, the coated substrate may be held at a temperature and for a time sufficient to substantially cure the composite coating after all coating layers have been applied to the substrate. Typical cure protocols include a temperature range of 70 to 180° C. for a time of 10 to 120 minutes.

The subsequently applied coating compositions may be any of those known in the art of surface coatings; typically they comprise a curable film-forming composition comprising a polymeric binder with functional groups and a curing agent having functional groups reactive with those on the polymeric binder. Each applied coating composition may be the same as or different from the previously applied coating compositions. The subsequently applied coating composition(s) can include a variety of optional ingredients and/or additives such as curing catalysts, reinforcements, thixotropes, accelerators, surfactants, plasticizers, extenders, stabilizers, corrosion inhibitors, diluents, hindered amine light stabilizers, UV light absorbers, and antioxidants.

Coated substrates prepared in accordance with the method of the present invention demonstrate improved appearance properties compared to commercial analogs coated with compositions that contain polyurethane or polyester resins, particularly with respect to shortwave $W_b$ (0.3 to 1.0 mm wavelength) smoothness, a measurement of the optical profile of the surface. Cross hatch adhesion (measured using ASTM D3359 Classification of Adhesion Test Results method; $9^{th}$ edition, Jun. 1, 2009; 5=Best), chip resistance (measured using stone chip test instrument Erichsen 508. Two 500 grams of steel shot (angular 4-5 mm) at 2.0 bar compressed air), hardness (measured using HM2000 Fischer Microhardness instrument), and humidity resistance (determined by a ten day humidity resistance test similar to ASTM D 1735-92 2014 Edition, Jun. 15, 2014, conducted in a Harshaw Equipment GS "Uni-Fog" corrosion test cabinet set at 100° F. (38° C.) and 100% relative humidity) are also at least equivalent to commercial analogs.

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in this specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various examples of the present invention as presented herein are each understood to be non-limiting with respect to the scope of the invention.

Each of the characteristics and examples described above, and combinations thereof, may be said to be encompassed by the present invention. The present invention is thus drawn to the following nonlimiting aspects:

1. An acrylic copolymer composition essentially free of solvents having a boiling point less than 120° C. and essentially free of acid-functional groups, and prepared from a monomer composition, wherein the monomer composition is essentially free of solvents having a boiling point less than 120° C. and essentially free of acid functional monomers, and wherein the monomer composition comprises:

(A) 30 to 70 percent by weight of a monomer having the structure (I):

wherein (i) X is NR' or O, R' is hydrogen or is a linear or branched alkyl group having 1 to 18 carbon atoms, and R is a linear or branched alkyl group having 1 to 18 carbon atoms, or (ii) X is N or O and R is a linear or branched alkyl group bonded to X to form a 5- to 7-member ring; based on the total weight of monomers in the monomer composition; and (B) 30 to 70 percent by weight, based on the total weight of monomers used to prepare the acrylic copolymer composition, of an ethylenically unsaturated monomer different from (A) and selected from at least one of vinyl compounds; nitriles; vinylidene compounds; alkyl esters of (meth)acrylic acid containing from 1 to 30 carbon atoms in the alkyl group; and aryl esters of (meth)acrylic acid containing from 6 to 30 carbon atoms in the aryl group.

2. The acrylic copolymer composition according to aspect 1, wherein the ethylenically unsaturated monomer (B) comprises an ethylenically unsaturated monomer having a reactive functional group selected from epoxy, hydroxy, amide, oxazoline, carbamate, amine, amine salt, quaternized amine, thiol, methylol, methylol ether, and sulfonium salt.

3. The acrylic copolymer composition according to either of aspects 1 or 2, wherein the monomer composition further comprises a solvent having a boiling point greater than 120° C.

4. The acrylic copolymer composition according to either of aspects 1 or 2, wherein the monomer composition further comprises a solvent having a boiling point greater than 125° C.

5. The acrylic copolymer composition according to either of aspects 1 or 2, wherein the monomer composition further comprises a solvent having a boiling point greater than 150° C.

6. The acrylic copolymer composition according to any of aspects 1 to 5 above, wherein the monomer composition comprises 40 to 70 percent by weight vinyl acetate, 10 to 40 percent by weight alkyl (meth)acrylate, and 10 to 30 percent by weight hydroxy functional alkyl (meth)acrylate, wherein each percentage is based on the total weight of monomers in the monomer composition.

7. The acrylic copolymer composition according to any of aspects 1 to 6 above, wherein an initiator composition is added to the monomer composition and comprises ditertbutyl peroxide or ditertamyl peroxide.

8. The acrylic copolymer composition according to any of aspects 1 to 7, wherein the ethylenically unsaturated monomer (B) comprises at least one of hydroxyethyl acrylate, hydroxypropyl acrylate, methyl acrylate, ethyl acrylate, butyl acrylate, isobutyl acrylate, isobornyl acrylate, dimethylaminoethyl acrylate, acrylamide, chlorotrifluoroethylene, glycidyl acrylate, 2-ethylhexyl acrylate and n-butoxy methyl acrylamide.

9. The acrylic copolymer composition according to any of aspects 1 to 8 above, wherein the monomer having structure (I) is selected from vinyl acetate, vinyl pivalate, vinyl laurate, vinyl dodecanoate, vinyl pyrrolidone and vinyl caprolactam.

10. A curable film-forming composition comprising:
(a) a curing agent having reactive functional groups; and
(b) the acrylic copolymer composition according to any of aspects 2 to 9 above, wherein the reactive functional groups on the ethylenically unsaturated monomer are reactive with the reactive functional groups on the curing agent (a).

11. The curable film-forming composition according to aspect 10, wherein the curing agent comprises an aminoplast, polyisocyanate, polyepoxide, beta-hydroxyalkylamide, polyacid, organometallic acid-functional material, polyamine, polyamide, polysulfide, polythiol, polyene, polyol, and/or polysilane.

12. A substrate at least partially coated with the curable film-forming composition according to either of aspects 10 or 11.

13. The substrate according to aspect 12, wherein the curable film-forming composition is applied to the substrate as a primer.

14. The substrate according to either of aspects 12 or 13, further comprising an additional coating layer.

15. The substrate according to aspect 14, wherein the additional coating layer comprises a topcoat composition applied on top of the curable film-forming composition.

The following examples are intended to illustrate the invention, and should not be construed as limiting the invention in any way. Percentages of components are by weight unless otherwise indicated.

EXAMPLES

Vinyl Acetate/Acrylic copolymers were synthesized using two pressurized stirred tank reactors in the presence of peroxy initiator at high temperature and pressure. The first reactor has a volume of 300 ml operating at 220-230° C., under pressure of 600 psi with residence time of 5 minutes and initiator feed charge B. The second reactor in line has a volume of 1 gallon operating at 170° C. with residence time of 20 minutes in the presence of chased initiator (Charge C). The copolymer solution was discharging with gear pump and diluted with more solvent.

Example A

Synthesis of 50% Vinyl acetate/20% 2-hydroxyethyl acrylate/30% butyl acrylate copolymer

| | Ingredients | Parts by weight (grams) |
|---|---|---|
| Charge A | Vinyl Acetate | 2012.5 |
| | Butyl acrylate | 1207.6 |
| | 2-Hydroxyethyl acrylate | 805 |
| | Solvent AROMATIC-100 | 804.0 (20% on monomer) |
| Charge B | Di-t-butyl peroxide | 120.8 (3% on monomer) |
| Charge C | Di-t-butyl peroxide | 41 (1% on monomer) |

Charges A and B were added to 300 mL stirred stainless steel pressure reactor and heated to 220° C. Charge A was added with feed rate 60 mL/minute. Charge B was added to rector with feed rate of 1.71 mL/minutes. During the monomers and initiator addition the temperature was maintained 220° C. at 400 psi. Charge C was added to second reactor with feed rate of 0.57 mL/minutes. The copolymer after gear pump was diluted with more solvent A-100. The final solids of the resulting resin was determined to be 71.2% determined at 110° C. for one hour. The resin had number average molecular weight, $M_n$=1790, weight average molecular weight $M_w$=6224 and polydispersity $M_w/M_n$=3.5, (determined by gel permeation chromatography using polystyrene as a standard). The hydroxyl value was 64 mg KOH/g resin, measured in a manner similar to that for determination of acid value, but including conversion of hydroxyl groups into acid by reacting with acetic anhydride and then titrating with KOH.

Example B

Synthesis of 50% Vinyl acetate/30% 2-hydroxyethyl acrylate/20% butyl acrylate copolymer

| | Ingredients | Parts by weight (grams) |
|---|---|---|
| Charge A | Vinyl Acetate | 2083.5 |
| | Butyl acrylate | 833.3 |
| | 2-Hydroxyethyl acrylate | 1250 |
| | Solvent AROMATIC-100 | 833.3 (20% on monomer) |
| Charge B | Di-t-butyl peroxide | 125.2 (3% on monomer) |
| Charge C | Di-t-butyl peroxide | 41.7 (1% on monomer) |

Charges A and B were added to 300 mL stirred stainless steel pressure reactor and heated to 220° C. Charge A was added with feed rate 60 mL/minute. Charge B was added to rector with feed rate of 1.74 mL/minutes. During the monomers initiator addition the temperature was maintained 230° C. at 400 psi. Charge C was added to second reactor with feed rate of 0.58 mL/minutes. The copolymer after gear pump was diluted with more solvent A-100 The final solids of the resulting resin was determined to be 71.9.3% determined at 110° C. for one hour. The resin had a number average molecular weight, $M_n$=1670, weight average molecular weight $M_w$=5187 and polydispersity $M_w/M_n$=3.1, (determined by gel permeation chromatography using polystyrene as a standard). The hydroxyl value was 95 mg KOH/g resin.

Example C

Synthesis of 50% Vinyl acetate/20% 2-hydroxyethyl acrylate/30% butyl acrylate copolymer

| | Ingredients | Parts by weight (grams) |
|---|---|---|
| Charge A | Vinyl Acetate | 2213.8 |
| | Butyl acrylate | 1328.3 |
| | 2-Hydroxyethyl acrylate | 885.5 |
| | Solvent AROMATIC-100 | 402.5 (10% on monomer) |
| Charge B | Di-t-butyl peroxide | 120.8 (3% on monomer) |
| Charge C | Di-t-butyl peroxide | 45.3 (1% on monomer) |

Charges A and B were added to 300 mL stirred stainless steel pressure reactor and heat to 230° C. Charge A was added with feed rate 60 mL/minute. Charge B was added to rector with feed rate of 1.89 mL/minutes. During the monomers initiator addition the temperature was maintained 230° C. at 400 psi. Charge C was added to second reactor with feed rate of 0.63 mL/minutes. The copolymer after gear pump was diluted with more solvent A-100. The final solids of the resulting resin was determined to be 70.3% determined at 110° C. for one hour. The resin had a number average molecular weight, $M_n$=2099, weight average molecular weight $M_w$=11283 and polydispersity $M_w/M_n$=5.4, (determined by gel permeation chromatography using polystyrene as a standard). The hydroxyl value was 64 mg KOH/g resin.

The resins prepared in the examples above were used to prepare curable film-forming compositions as shown in the examples below, and compared to a commercially available coating composition. In the examples of the present invention, the resins prepared above were used to replace the film-forming resin in the commercial product used as a control. The control primer surfacer composition of Example 1 is commercially available from PPG Industries, Inc., as GPX5051W. Ingredients were added to a vessel in the order listed and stirred.

| | Parts by Weight of Component | | |
|---|---|---|---|
| Components | Example 2 | Example 3 | Example 4 |
| Vinyl Acetate Resin [1] | 55.0 | — | — |
| Vinyl Acetate Resin [2] | — | 54.5 | — |
| Vinyl Acetate Resin [3] | — | — | 55.7 |
| Isobutanol | 16.8 | 16.8 | 16.8 |
| Diacetone Alcohol | 28.0 | 28.0 | 28.0 |
| Dowanol PM[4] | 22.4 | 22.4 | 22.4 |
| Toluene | 231.6 | 254.6 | 254.6 |
| Butyl Cellosolve Acetate[5] | 7.1 | 7.1 | 7.1 |
| Resimene 718[6] | 11.2 | 11.2 | 11.2 |
| Epoxy resin solution[7] | 61.5 | 61.5 | 61.5 |
| Tint Paste[8] | 386.6 | 386.6 | 386.6 |
| Catalyst[9] | 23.3 | 23.3 | 23.3 |
| Total | 843.5 | 866.0 | 867.2 |

[1] Vinyl Acetate Resin Example A
[2] Vinyl Acetate Resin Example B
[3] Vinyl Acetate Resin Example C
[4] Propylene glycol methyl ether commercially available from Dow Chemical
[5] 2-butoxyethyl ester of acetic acid commercially available from Dow Chemical
[6] Methylated melamine-formaldehyde resin curing agent commercially available from INEOS Melamines
[7] Araldite GT 7072 commercially available from Huntsman Advanced Materials diluted to 50% with solvent blend
[8] White tint paste consisting of 17% $TiO_2$ and 6% aluminum silicate dispersed in 5% polyvinyl butyral and having a solids content of 40%
[9] 20% solution of phosphoric acid in isobutanol Each primer was spray applied onto 4 inch by 12 inch (10 cm by 30 cm) steel panels that were coated with PPG Electrocoat (ED6465) commercially available from PPG Industries, Inc. The substrate panels were obtained from ACT Test Panels, LLC of Hillsdale, Mich. The primers were applied in two coats with approximately 30 seconds between coats, and then flashed at ambient temperature for 7 minutes. The primer panels were then baked for 30 minutes at 300° F. (150° C.). The film thickness was approximately 1.2 mils (30 microns). The primer panels were then topcoated with Olympic White waterborne basecoat and TKS1050 Clearcoat, both commercially available from PPG Industries, Inc.

Appearance was measured on the coated panels. Higher 20° gloss, higher DOI values and lower BYK Wavescan values are more desirable for appearance.

| | | BYK Wavescan[11] | |
|---|---|---|---|
| Example | 20° Gloss[10] | DOI | Shortwave |
| 1 (control) | 84 | 75 | 63 |
| 2 | 86 | 80 | 59 |
| 3 | 82 | 81 | 52 |
| 4 | 83 | 78 | 60 |

[10] BYK Gardner Micro-gloss 20° instrument manufactured by BYK Gardner USA of Columbia, Maryland and used according to manufacturer's instructions
[11] BYK Wavescan instrument manufactured by BYK Gardner USA of Columbia, Maryland and used according to manufacturer's instructions Therefore, we claim:

1. An acrylic copolymer composition essentially free of solvents having a boiling point less than 120° C. and essentially free of acid-functional groups, and prepared from a monomer composition, wherein the monomer composition is essentially free of solvents having a boiling point less than 120° C. and essentially free of acid functional monomers, and wherein the monomer composition comprises:
    (A) 30 to 70 percent by weight of a monomer having the structure (I):

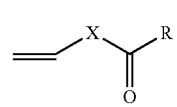

(I)

wherein (i) X is NR' or O, R' is hydrogen or is a linear or branched alkyl group having 1 to 18 carbon atoms, and R is a linear or branched alkyl group having 1 to 18 carbon atoms, or (ii) X is N or O and R is a linear or branched alkyl group bonded to X to form a 5- to 7-member ring; based on the total weight of monomers used to prepare the acrylic copolymer composition; and
    (B) 30 to 70 percent by weight, based on the total weight of monomers used to prepare the acrylic copolymer composition, of an ethylenically unsaturated monomer different from (A) and selected from at least one of vinyl compounds; nitriles; vinylidene compounds; alkyl esters of (meth)acrylic acid containing from 1 to 30 carbon atoms in the alkyl group; and aryl esters of (meth)acrylic acid containing from 6 to 30 carbon atoms in the aryl group.

2. The acrylic copolymer composition of claim 1, wherein the ethylenically unsaturated monomer (B) comprises an ethylenically unsaturated monomer having a reactive functional group selected from epoxy, hydroxy, amide, oxazoline, carbamate, amine, amine salt, quaternized amine, thiol, methylol, methylol ether, and sulfonium salt.

3. The acrylic copolymer composition of claim 1, wherein the ethylenically unsaturated monomer (B) comprises at least one of hydroxyethyl acrylate, hydroxypropyl acrylate, methyl acrylate, ethyl acrylate, butyl acrylate, isobutyl acrylate, isobornyl acrylate, dimethylaminoethyl acrylate, acrylamide, chlorotrifluoroethylene, glycidyl acrylate, 2-ethylhexyl acrylate and n-butoxy methyl acrylamide.

4. The acrylic copolymer composition of claim 1, wherein the monomer composition further comprises a solvent having a boiling point greater than 120° C.

5. The acrylic copolymer composition of claim 4, wherein the solvent has a boiling point greater than 150° C.

6. The acrylic copolymer composition of claim 1, wherein the monomer (A) having structure (I) is selected from vinyl acetate, vinyl pivalate, vinyl laurate, vinyl dodecanoate, vinyl pyrrolidone and vinyl caprolactam.

7. The acrylic copolymer composition of claim 6, wherein the monomer composition comprises 40 to 70 percent by weight vinyl acetate, 10 to 40 percent by weight alkyl (meth)acrylate, and 10 to 30 percent by weight hydroxy functional alkyl (meth)acrylate, wherein each percentage is based on the total weight of monomers in the monomer composition.

8. The acrylic copolymer composition of claim 1, wherein an initiator composition is added to the monomer composition and comprises ditertbutyl peroxide or ditertamyl peroxide.

9. A curable film-forming composition comprising:
(a) a curing agent having reactive functional groups; and
(b) the acrylic copolymer composition of claim 2, wherein the reactive functional groups on the ethylenically unsaturated monomer are reactive with the reactive functional groups on the curing agent (a).

10. The curable film-forming composition of claim 9, wherein the monomer composition used to prepare the acrylic copolymer comprises 40 to 70 percent by weight vinyl acetate, 10 to 40 percent by weight alkyl (meth)acrylate, and 10 to 30 percent by weight hydroxy functional alkyl (meth)acrylate, wherein each percentage is based on the total weight of monomers in the monomer composition.

11. The curable film-forming composition of claim 9, wherein the curing agent comprises an aminoplast, polyisocyanate, polyepoxide, beta-hydroxyalkylamide, polyacid, polyamine, polyamide, polysulfide, polythiol, polyene, polyol, and/or polysilane.

12. A substrate at least partially coated with the curable film-forming composition of claim 9.

13. The substrate of claim 12, wherein the curable film-forming composition is applied to the substrate as a primer.

14. The substrate of claim 13, further comprising an additional coating layer applied on top of the curable film-forming composition.

15. The coated substrate of claim 14, wherein the additional coating layer is applied as a topcoat composition.

* * * * *